(12) United States Patent
Jia et al.

(10) Patent No.: US 11,499,826 B2
(45) Date of Patent: Nov. 15, 2022

(54) LONG-TERM IN-SITU OBSERVING DEVICE AND METHOD FOR DEEP SEA BOTTOM-SUPPORTED ENGINEERING GEOLOGICAL ENVIRONMENT

(71) Applicant: OCEAN UNIVERSITY OF CHINA, Shandong (CN)

(72) Inventors: Yonggang Jia, Shandong (CN); Chaoqi Zhu, Shandong (CN); Xiujun Guo, Shandong (CN); Qingsheng Meng, Shandong (CN); Tao Liu, Shandong (CN); Lanjun Liu, Shandong (CN); Haibo Xu, Shandong (CN); Minsheng Zhang, Shandong (CN); Xiaolei Liu, Shandong (CN); Dong Wang, Shandong (CN); Hongxian Shan, Shandong (CN)

(73) Assignee: OCEAN UNIVERSITY OF CHINA, Shandong (CN)

( * ) Notice: Subject to any disclaimer, the term of this patent is extended or adjusted under 35 U.S.C. 154(b) by 327 days.

(21) Appl. No.: 16/608,632

(22) PCT Filed: May 22, 2019

(86) PCT No.: PCT/CN2019/087891
§ 371 (c)(1),
(2) Date: Oct. 25, 2019

(87) PCT Pub. No.: WO2019/237893
PCT Pub. Date: Dec. 19, 2019

(65) Prior Publication Data
US 2021/0364290 A1    Nov. 25, 2021

(30) Foreign Application Priority Data

Jun. 14, 2018 (CN) .......................... 201810614522.9

(51) Int. Cl.
*G01C 13/00* (2006.01)
*G01D 21/02* (2006.01)
(Continued)

(52) U.S. Cl.
CPC ............. *G01C 13/00* (2013.01); *G01D 21/02* (2013.01); *G01L 11/025* (2013.01); *G01N 1/10* (2013.01);
(Continued)

(58) Field of Classification Search
CPC . G01C 13/00; G01V 1/38; G01V 3/12; G01V 11/002; G01V 2210/1427;
(Continued)

(56) References Cited

FOREIGN PATENT DOCUMENTS

| CN | 1804923 | * | 7/2006 |
| CN | 101158673 | * | 4/2008 |

(Continued)

*Primary Examiner* — Robert R Raevis

(57) ABSTRACT

A long-term in-situ observation device for the deep sea bottom supported engineering geological environment is provided, including: a sediment acoustic probe, a sediment pore water pressure probe, a three-dimensional resistivity probe, a water observation instrument, a long-term observation power supply system, a probe hydraulic penetration system, a general control and data storage transmission system, an acoustic releaser, an underwater acoustic communication apparatus, and an instrument platform. The observations include the engineering properties, physical properties, mechanical properties, and biochemical properties of a seawater-seabed interface-sediment. The engineering properties and the physical and mechanical indexes of seafloor sediments are comprehensively determined by three-dimensional measurement of seafloor resistivity and acoustic wave measurements. The physical and biochemical properties of seawater are expected to be acquired by (Continued)

sensors. The observation probe penetrates into the sediments following the hydraulic method.

3 Claims, 7 Drawing Sheets

(51) Int. Cl.
*G01L 11/02* (2006.01)
*G01N 1/10* (2006.01)
*G01V 1/38* (2006.01)
*G01V 3/12* (2006.01)
*G01V 11/00* (2006.01)

(52) U.S. Cl.
CPC .................. *G01V 1/38* (2013.01); *G01V 3/12* (2013.01); *G01V 11/002* (2013.01); *G01N 2001/1025* (2013.01); *G01V 2210/1427* (2013.01)

(58) Field of Classification Search
CPC G01L 11/025; G01N 1/10; G01N 2001/1025; G01D 21/02
USPC .... 73/170.29, 170.33, 73, 81, 82, 84, 865.8, 73/866, 432.1
See application file for complete search history.

(56) References Cited

FOREIGN PATENT DOCUMENTS

| CN | 101923073 | * | 12/2010 |
| CN | 102331275 | * | 1/2012 |
| CN | 203078741 | * | 7/2013 |
| CN | 108645668 | * | 10/2018 |
| CN | 108955764 | * | 12/2018 |
| CN | 109099972 | * | 12/2018 |

* cited by examiner

LONG-TERM IN-SITU OBSERVING DEVICE AND METHOD FOR DEEP SEA BOTTOM-SUPPORTED ENGINEERING GEOLOGICAL ENVIRONMENT

CROSS REFERENCE OF RELATED APPLICATION

This is a U.S. National Stage under 35 U.S.C 371 of the International Application PCT/CN2019/087891, filed May 22, 2019, which claims priority under 35 U.S.C. 119(a-d) to CN 201810614522.9, filed Jun. 14, 2018.

BACKGROUND OF THE PRESENT INVENTION

Field of Invention

The present invention relates to the technical field of ocean observation technology, and more particularly to a long-term in-situ observing device and method for deep sea bottom-supported engineering geological environment.

Description of Related Arts

With the marine engineering such as the development of marine oil and gas resources gradually moving from shallow sea to deep sea, the importance of deep sea observation to ocean engineering is increasingly prominent. Moreover, the answers to many marine science questions also require the confirmation and support of ocean observation data. The long-term in-situ observation of the offshore engineering geological environment in the deep sea not only has important scientific significance, but also has practical engineering application value.

At present, although the seabed observation network under construction in China has solved the problem of data transmission and observation power demand to a certain extent, the seabed observation network consumes a large amount of money, has a long construction period, and has poor flexibility and maintenance difficulties. Compared with the submarine observation network, there is also a submarine observation platform with independent power supply, which has high flexibility, but it is difficult to achieve synchronization, in situ, long-term and real-time observation of seawater and sediment. Moreover, the conventional observation platform is not capable of realizing the comprehensive observation of the engineering, physical, mechanical and biochemical properties of the seawater-seabed interface-sediment. At present, the in-situ observation device for sediments uses its own gravity to observe the penetration of the probe into the sediment, which cannot guarantee the penetration effect of the observation probe. How to realize the comprehensive, in-situ, long-term and real-time observation of the engineering, physical, mechanical and biochemical properties of seawater-seabed interface-sediment under limited construction funds and complex deep sea conditions is still a technical problem failing to be solved.

SUMMARY OF THE PRESENT INVENTION

An object of the present invention is to provide a long-term in-situ observing device and method for deep sea bottom-supported engineering geological environment, which can make up for the defects or deficiencies of the conventional arts.

A long-term in-situ observation device for a deep sea bottom-supported engineering geological environment, comprises: a instrument platform in a frame structure; wherein a sedimentary acoustic probe, a sediment pore water pressure probe, a three-dimensional resistivity probe, a probe hydraulic penetration system configured to penetrate the probe into the seabed sediment, a water observation instrument, a long-term observation power supply system, a master control and data storage transmission system, an acoustic release and a hydro-acoustic communicator are provided on the instrument platform;

wherein the sediment acoustic probe comprises an acoustic signal transmitting probe and an acoustic signal receiving probe; wherein a directional transmission transducer is provided on the acoustic signal emitting probe, a receiving transducer is respectively provided at each different depths of the acoustic signal receiving probe; an end of the acoustic signal transmitting probe and an end of the acoustic signal receiving probe are connected to the master control and data storage transmission system through acoustic signal transmission lines;

the directional transmission transducer adopts a plurality of annular piezoelectric ceramic tubes connected in parallel to improve an emission voltage response of the directional transmission transducer; the receiving transducer adopts a plurality of annular piezoelectric ceramic tubes connected in series to improve a receiving sensitivity of the receiving transducer;

wherein the three-dimensional resistivity probe comprises a resistivity vertical probe and four resistivity level probes which are crossed;

wherein electrode rings are respectively provided on the resistive vertical probe and the resistivity level probe with intervals; wherein the resistive vertical probe and the resistivity level probe are made of a three-type polypropylene material, and the electrode is a graphite electrode embedded in a probe body;

the pore water pressure sensor of the sediment pore water pressure probe adopts a fiber grating differential pressure sensor capable of converting a strain change on a grating into a wavelength change, and calibrating a relationship between the change of the center wavelength of the fiber grating and the pore water pressure is calibrated, and inversing observation data into the pore water pressure of the sediment; wherein a rod body part of the sediment pore water pressure probe is a stainless steel pipe, a pore water pressure sensor is provided on a bottom of the stainless steel pipe, and an end of the pore water pressure sensor is connected to the general control and data storage transmission system through a pore water pressure signal transmission line;

the water observation instrument comprises an integrated observation unit for a suspended matter concentration, a methane concentration, a dissolved oxygen concentration, a carbon dioxide concentration, a temperature, a salinity, and a current.

Preferably, a data processing method of the sediment acoustic probe comprises: extracting amplitude of acoustic waves received by two receiving transducers through a spectrum technology to calculate an attenuation amplitude of the acoustic waves;

through an indoor test, determining a relationship between acoustic parameters and physical properties of the sediments to invert acoustic parameters into physical parameters;

wherein the acoustic parameters are a speed of sound and an amplitude of sound attenuation; the physical properties of the sediment are density, water content, liquid plastic limit, porosity ratio, specific gravity, and strength.

Preferably, a data processing method of the three-dimensional resistivity probe comprises: by a difference between an electrical resistivity of sea water and the sediment, determining a position where a sudden variation of the electrical resistivity being measured by the vertical resistive rod to be a position of a seabed boundary;

according to a position change of the seabed boundary, calculating a deposition rate of seabed erosion;

through laboratory tests, determining a relationship between a concentration of suspended solids in the seawater and the resistivity, determining a relationship between the physical and mechanical properties and the electrical resistivity of the sediment; wherein the physical and mechanical properties of the sediment are density, water content, liquid plastic limit, and void ratio, specific gravity, and strength;

according to the concentration of suspended solids in sea water and the physical properties of sediments inverted by the resistivity measured, comparing and analyzing physical and mechanical properties inversed by the sediment the sedimentary acoustic probe and the three-dimensional resistivity probe, and finally determining the physical and mechanical properties of the sediment.

Preferably, the probe hydraulic penetration system comprises a hydraulic cabin provided on the instrument platform, a control cabin, a drive cabin, a penetration mechanism battery compartment, and a penetration mechanical hand.

Preferably, the water observation instrument is centrally powered by a long-term observation power supply system, or is independently powered by a self-contained battery.

Preferably, the long-term observation power supply system comprises four power generation units and two electric energy storage units;

wherein the power generation units adopt seawater dissolved oxygen batteries, and the four power generation units are provided in a central symmetric manner and are evenly provided outside the instrument platform; a frame structure of the instrument platform is an open frame for internal seawater to pass freely; in such a manner that a sea current velocity near the power generation units is guaranteed to ensure a dissolved oxygen supply of the power supply system; wherein two electric energy storage units alternately charge and discharge, that is, one for storing electric energy and the other for powering an observation system.

Preferably, four anti-overturning bases are provided symmetrically on a bottom of the instrument platform for preventing overturning of the submarine observation device.

A releasing method of the long-term in-situ observation device for the deep sea bottom-supported engineering geological environment comprises steps of:

driving a survey vessel to a designated station and stopping the survey vessel; connecting a shipborne geological winch cable with the acoustic releaser (8); and releasing the long-term in-situ observation device for the deep sea bottom-supported engineering geological environment through a shipborne geological winch, and a release speed is less than 1 m/s;

according to a depth of a station and a length of the cable released, when a distance between the observation device and the seabed is at a range of 100 m-200 m, decreasing a release speed to prevent a shock on the observation device from being damaged while contacting a bottom;

after the instrument contacts the bottom, penetrating the sediment acoustic probe, the sediment pore water pressure probe and the three-dimensional resistivity probe into the sediments through the probe hydraulic penetration system of the observation device; wherein a penetration manner is sequential penetration or one-time penetration;

after the penetrating, activating the acoustic releaser at the top end of the observation device; after the acoustic releaser is released, disconnecting the cable from the observation device, recovering the cable to finish release the observation device.

A method for recovering the long-term in-situ observation device for a deep sea bottom-supported engineering geological environment comprises steps of:

according to coordinates of a designated station, driving a survey vessel to a release position by GPS positioning;

fixing one end of the shipborne ground winch cable to the acoustic receiver of the sea bottom observation device by an ROV water machine; and after the ROV water machine is recovered, loading the ground winch cable by a retriever to complete recovering the sea bottom observation device.

The present invention has the following significant advantages.

The observations of the present invention comprises suspended matter concentration, methane concentration, dissolved oxygen concentration, carbon dioxide concentration, temperature, salinity, ocean current, erosion deposition rate at the seabed interface, engineering properties, acoustic properties, electrical properties of the sediment, and pore water pressure.

The flow rate and flow direction of the seawater are obtained by observation by a current meter mounted on the observation device; methane concentration, dissolved oxygen concentration, and carbon dioxide concentration are obtained by observation of the gas concentration sensor mounted; the concentration of suspended matter is obtained by inversion of resistivity observation; temperature, salinity; the seawater turbidity is obtained by observation of a multi-parameter sensor loaded.

The erosion rate of the seabed surface is obtained by real-time measurement of the resistivity vertical probe penetrating into the seafloor sediment. The value of seawater and sediment resistivity measured by the resistivity vertical probe is the seabed interface. According to differences in conductivity between the sediment and seawater, a position where resistivity change appears is a seabed interface.

The engineering properties and physical and mechanical index parameters of seabed sediments are comprehensively determined by three-dimensional measurement of seafloor resistivity and acoustic wave measurement results. The spatial and temporal changes of resistivity, acoustic impedance and acoustic attenuation of seafloor sediments are observed in situ. Through the field and laboratory soil mechanics tests, relationships of the seafloor soil resistivity, acoustic parameters and density, water content, liquid plastic limit, and void ratio were established. The relationship between specific gravity, strength, and inversion of engineering properties, physical and mechanical properties and dynamic changes of seafloor sediments through electrical and acoustic observations are established. The specific process of sound wave inversion is to extract the amplitude of the sound wave received by the two receiving transducers through the spectrum technique, and find the attenuation amplitude of the sound wave. Through the indoor test, the relationship between the acoustic parameters (sound velocity and sound attenuation amplitude) and the physical and mechanical properties of the sediment is determined, and the acoustic parameters are inverted into physical and mechanical parameters.

Sediment acoustic probes, sediment pore water pressure probes and three-dimensional resistivity probes are hydraulically penetrated into the sediment through the hydraulic penetration of the probes to avoid uncontrollable gravity penetration.

In order to ensure the smooth penetration of the probe into the sediment, for the hard bottomed sea area, sediment acoustic probes, sediment pore water pressure probes and three-dimensional resistivity probes are consistently entered; for soft ground areas, sediment acoustics The probe, the sediment pore water pressure probe and the three-dimensional resistivity probe are uniformly penetrated once.

The observation data adopts two modes of real-time transmission and self-contained storage. The key data is in real-time transmission mode, and the rest of the data is in self-contained storage mode. It not only ensures the real-time nature of the data, but also provides data for disaster warning, etc.; it also reduces power supply and prolongs observation time.

Power is supplied using a long-term observation power supply system. The power generation unit is realized by dissolving oxygen batteries in seawater to ensure the demand for electricity. Avoid carrying large numbers of batteries or laying long-distance submarine cables.

The power generation unit has four units, which are arranged symmetrically on the outside of the instrument-mounted platform; the instrument-mounted platform is open, and the internal seawater can pass freely; the sea current velocity near the power generation unit is ensured to ensure the dissolved oxygen supply of the power supply system.

The electric energy storage unit has a total of two. The electrical energy storage unit alternates between charging and discharging, that is, one stores power and the other supplies power to the observation system.

Considering that when the observation probe is penetrated, the observation device has just been released into the sea, and the long-term observation power supply system has not stored enough electric energy, and the power supply of the probe hydraulic penetration system is independently provided by the penetration mechanism battery compartment.

The invention can be carry out the in-situ, long-term, real-time and comprehensive observation of the engineering properties, physical properties, mechanical properties and biochemical properties of the seawater-seabed interface-sediment in the water depth range of 2000 m. It has application value in marine environmental monitoring and marine geological disaster monitoring.

Figure 1:
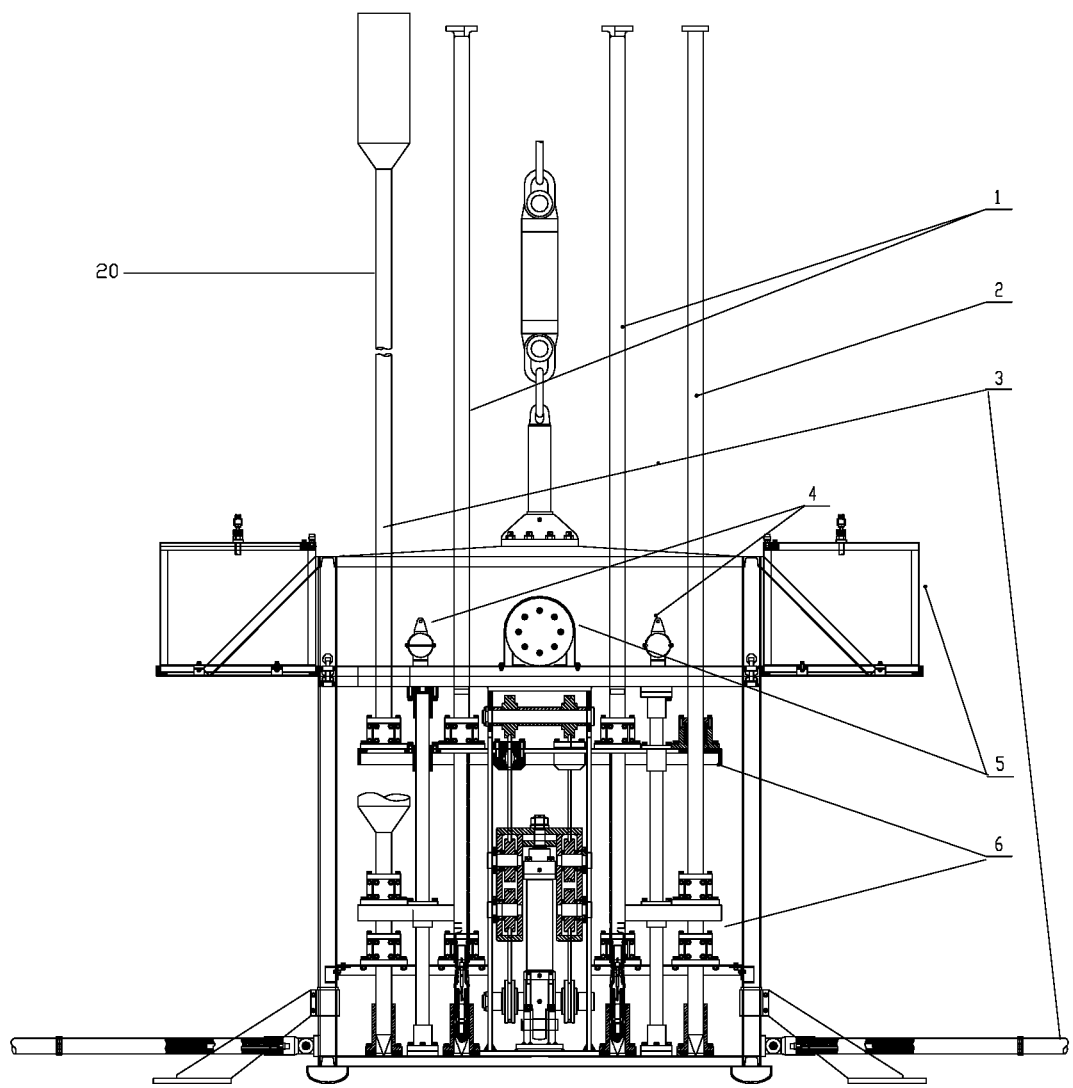
FIG. 1 is a left view of the present invention.
Figure 2:
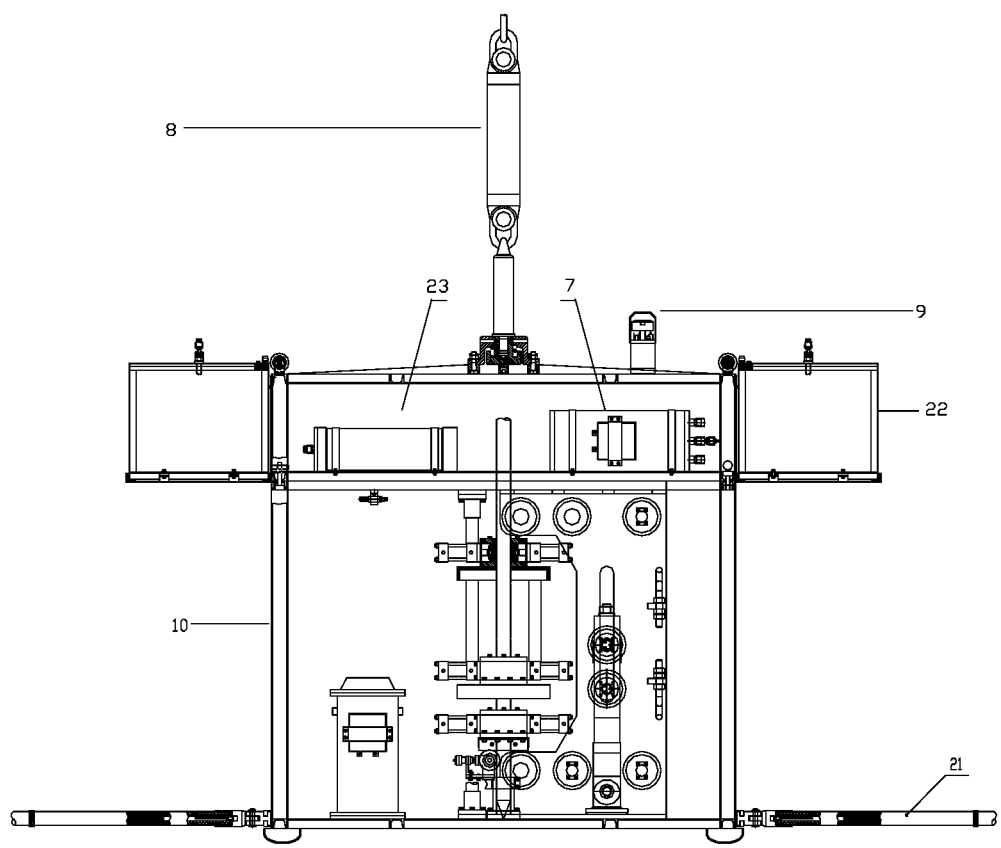
FIG. 2 is a front view of the present invention (vertical probes not shown).
Figure 3:
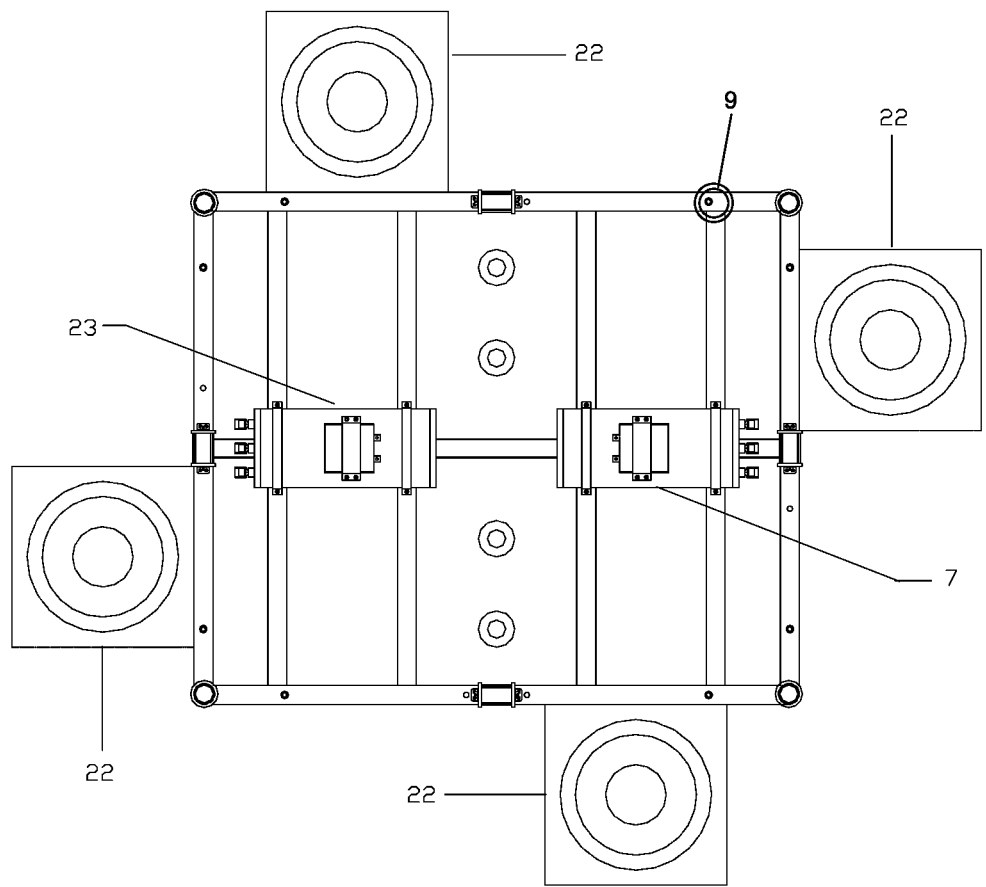
FIG. 3 is a top view of a portion above a general control and data storage transmission system of the present invention.

Among them, 1—sediment acoustic probe, 2—sediment pore water pressure probe; 3—three-dimensional resistivity probe; 4—water observation instrument; 5—long-term observation power supply system; 6—probe hydraulic penetration system; 7—general control and data storage transmission system; 8—acoustic releaser; 9—underwater acoustic communication apparatus; 10—instrument platform; 11—acoustic signal emitting probe; 12—acoustic signal receiving probe; 13—directional transmission transducer; 14—receiving transducer; 15—acoustic signal transmission line, 16—stainless steel pipe; 17—pore water pressure sensor; 18—penetration cone; 19—pore water pressure signal transmission line; 20—resistivity vertical probe; 21—resistivity level probe; 22—power generation unit; 23—electric energy storage unit; 24—hydraulic cabin; 25—control cabin; 26—drive cabin; 27—penetration mechanism battery compartment; 28—penetration mechanical hand; 29—anti-overturning base.

DETAILED DESCRIPTION OF THE PREFERRED EMBODIMENT

As shown in FIGS. 1-4, a long-term in-situ observation device for the deep sea bottom supported engineering geological environment of the present invention mainly comprises: a sediment acoustic probe 1, a sediment pore water pressure probe 2, a three-dimensional resistivity probe 3, a water observation instrument 4, a long-term observation power supply system 5, a probe hydraulic penetration system 6, a general control and data storage transmission system 7, an acoustic releaser 8, an underwater acoustic communication apparatus 9, and an instrument platform 10; wherein the sediment acoustic probe 1, the sediment pore water pressure probe 2, the three-dimensional resistivity probe 3, and the water observation instrument 4 serve as a seabed observation unit.

The water observation instrument 4 mainly integrates an observation unit for a suspended solid concentration, a methane concentration, a dissolved oxygen concentration, a carbon dioxide concentration, a temperature, a salinity, and a current. An other elemental observation instrument for water can also be mounted on the instrument platform 10.

The above-mentioned water body observation instrument 4 can be centrally powered by the long-term observation power supply system 5, or can be independently powered by a battery contained thereby.

The observation data adopts two modes comprising a real-time transmission mode and self-contained storage mode. Key data is in real-time transmission mode, and the rest of the data is in self-contained storage mode. In order to realize remote command signal transmission and real-time data transmission, the instrument platform 10 is equipped with an underwater acoustic communication apparatus 9.

The long-term observation power supply system 5 is mainly composed of four power generation units 22 and two system power storage units 23. The power generation unit is realized by dissolving oxygen batteries in seawater to ensure the demand for electricity.

The power generating units 22 has a total number of four, which are provided symmetrically on an outside of the instrument platform 10; the instrument platform is open, and the internal seawater can pass freely; in such a manner that a sea current speed near the power generating unit is ensured to ensure dissolution oxygen supply of the power supply system.

There are two electric energy storage units 23 in total. The electrical energy storage units alternate between charging and discharging, that is, one stores power and the other supplies power to the observation system.

In order to prevent the submarine observation device from tipping over, four anti-overturning bases 29 are mounted on the bottom of the instrument platform 10. The four anti-overturning bases 29 are arranged at the four corners of the instrument platform 10 in a center-to-front arrangement.

Figure 5:
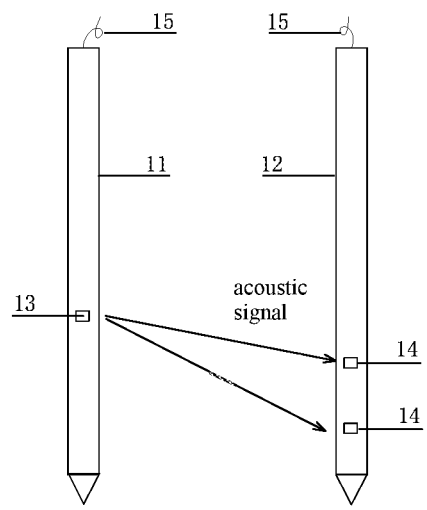
FIG. 5 is a schematic view of a sediment acoustic probe of the present invention.

As shown in FIG. 5, the sediment acoustic probe 1 of the present invention comprises an acoustic signal emitting probe 11 and an acoustic signal receiving probe 12.

The acoustic signal emitting probe 11 described above is mounted with a directional transmitting transducer 13; two receiving transducers 14 are mounted at different depths on the acoustic signal receiving probe 12.

Workflow of the sediment acoustic probe measuring is specifically as follows.

After the penetration of the sediment acoustic probe 1 is completed, the master control and data storage transmission system 7 transmits a start operation command to the acoustic signal transmission probe 11 through the acoustic probe signal transmission line 15, and the excitation transmission transducer 13 generates an acoustic wave signal.

The acoustic signal is transmitted by the receiving transducer 14 after being propagated in the seabed sediment, and the acoustic signal receiving probe 12 performs data acquisition by performing pre-amplification, filtering, automatic gain control and the like on the acoustic signal. The data is further transmitted to the embedded industrial computer through the acoustic signal transmission line 15 for compression and storage.

The acoustic observation data processing process is specifically as follows:

The two receiving transducers 14 mounted by the acoustic signal receiving probe 12 can successively receive sound waves arriving at different depths emitted by the same directional transmitting transducer 13 on the acoustic signal transmitting probe 11. The time difference T at which the acoustic signal reaches the two receiving transducers 14 can be determined, and the distances of the two receiving transducers 14 are known L, and the velocity V at which the acoustic waves propagate in the deposit can be calculated.

The velocity V of the sound wave propagating in the sediment is calculated as $V=L/T$.

The amplitude of the acoustic wave received by the two receiving transducers 14 is extracted by the spectrum technique, and the attenuation amplitude of the acoustic wave is obtained. Through indoor experiments, the relationship between acoustic parameters (sound velocity and sound attenuation amplitude) and sediment physical and mechanical properties (density, water content, liquid plastic limit, void ratio, specific gravity, strength) is determined, and acoustic parameters are inverted into physical mechanics, parameter.

In order to improve the emission voltage response of the transmitting transducer 13, a plurality of annular piezoelectric ceramic tubes is used in parallel.

In order to improve the receiving sensitivity of the receiving transducer 14, a plurality of annular piezoelectric ceramic tubes is used in series.

Figure 6:
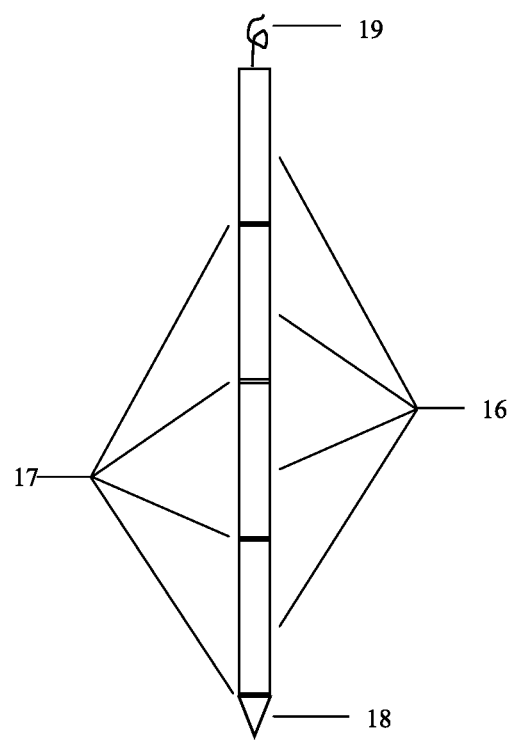
FIG. 6 is a schematic view of a deposit pore water pressure probe of the present invention.

As shown in FIG. 6, the pore water pressure probe 4 of the present invention is mainly composed of a 4-section stainless steel pipe 16, a four-porosity water pressure sensor 17, and a penetration cone 18.

The sediment pore water pressure probe 2 is connected to the main control and data storage transmission system 7 through the pore water pressure probe signal transmission line 19 for data communication and signal transmission.

In order to prevent seawater from corroding the probe, the stainless steel pipe 16 is made of 316L stainless steel.

The pore water pressure sensor 17 is a fiber grating differential pressure sensor. The strain change on the grating is converted into a wavelength change, and the relationship between the change of the center wavelength of the fiber grating and the pore water pressure is calibrated. The observation data is inverted into sediment pore water pressure.

Figure 4:
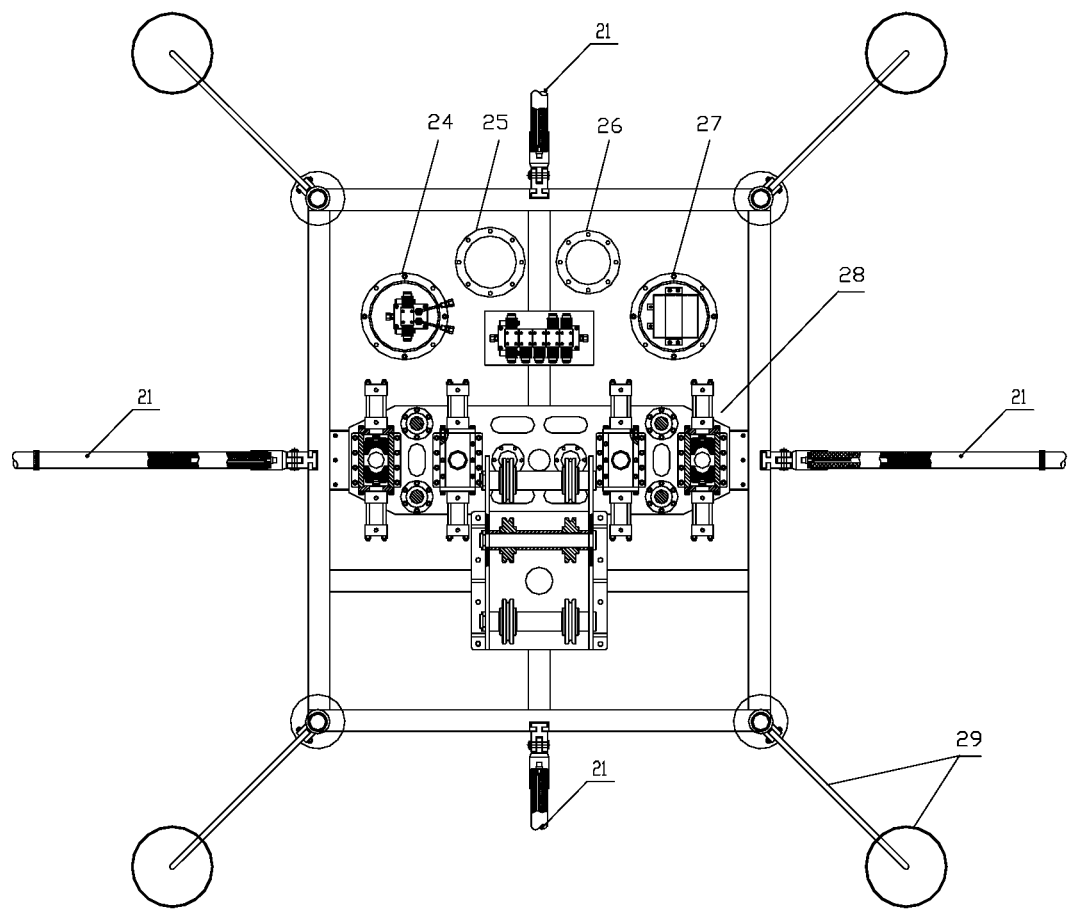
FIG. 4 is a top view of a portion below the general control and data storage transmission system of the present invention.

As shown in FIGS. 1 and 4, the three-dimensional resistivity probe 3 is composed of one resistivity vertical probe 20 and four cross-resistivity level probes 21.

The resistivity vertical probe 20 and the resistivity level probe 21 are spaced apart from each other with an electrode ring.

The material of the resistivity probe rod is made of three-type polypropylene material, and the electrode is made of graphite electrode and embedded in the rod body.

After the master control and data storage transmission system 7 issues the command, the electrodes on the resistivity vertical probe 20 are measured in a Wenner manner to measure the resistivity at different depths along the vertical probe 20.

The three-dimensional resistivity observation of the deposit can be performed by the resistivity vertical probe 20 and the resistivity level probe 21.

The three-dimensional resistivity observation of the above deposits uses a two-pole device. During observation, the supply electrode B and the measuring pole N are respectively placed at infinity by using a dedicated wire; the electrode A is selected from electrodes of different depths of the resistivity vertical probe 20, and the measuring electrode M is selected from the electrodes of the four resistivity level probes 21 respectively.

In order to save power consumption in long-term observations while ensuring a strong current field in the sediment, the above three-dimensional resistivity observation uses parallel technology. That is, each time the power is supplied, the potential pole on the resistivity level probe 21 is simultaneously measured.

Figure 7:
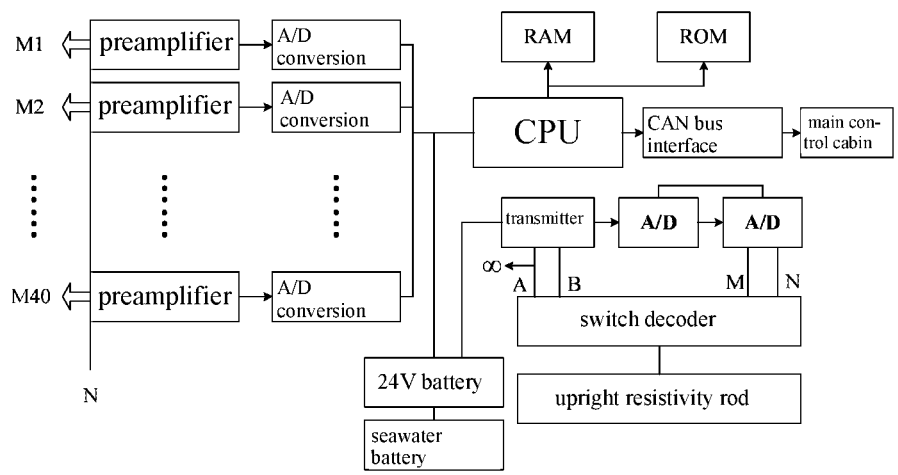
FIG. 7 is a circuit diagram of a three-dimensional resistivity data acquisition circuit of the present invention.

FIG. 7 is a circuit diagram of a three-dimensional resistivity data acquisition circuit of the present invention.

The above three-dimensional resistivity observation and acquisition circuit mainly comprises a central control circuit, a three-dimensional resistivity parallel acquisition circuit, a vertical probe electrode conversion and acquisition circuit, and a power supply circuit.

The above central control circuit is composed of a central processing unit (CPU) and a storage device, and realizes the entire acquisition and storage process and data transmission control.

The central processing unit (CPU) uses the 32-bit embedded processor ARM9. Two different types of memory RAM and ROM are connected to ARM19 to implement program and data acquisition.

The main controller and ARM9 are connected by CAN bus interface.

The three-dimensional resistivity parallel acquisition circuit is composed of a plurality of parallel channels, each channel is composed of a preamplifier and an A/D conversion circuit, and each channel input is a measured potential between the selected rod electrode and the infinity pole N.

The vertical probe electrode conversion and acquisition circuit is mainly composed of a switch decoder and a power supply and measurement circuit, and the power supply circuit and the measurement circuit are respectively connected by two wires and a switch decoder. During the measurement, the selection electrode is connected to the power supply and measurement circuit through the switch decoder.

The power supply circuit is connected to the seawater battery, and is connected to the CPU and the transmitter respectively after being connected to the voltage regulator, respectively, and supplies power to the acquisition host and the transmitter respectively.

Due to the difference in electrical resistivity between seawater and sediment, the site of the seabed interface is the sudden change in the resistivity measured by the resistivity vertical probe 20. According to the change of the seabed interface position, the seabed erosion deposition rate can be estimated.

Through laboratory tests, the relationship between the concentration of suspended solids in seawater and resistivity is determined, and the relationship between physical and mechanical properties of sediment (density, water content, liquid plastic limit, void ratio, specific gravity, strength) and electrical resistivity is determined. Then, the concentration of seawater suspension and the physical and mechanical properties of the sediment can be inverted based on the measured resistivity.

The physico-mechanical properties of the deposits of the sediment acoustic probe 1 and the three-dimensional resistivity probe 3 can be compared and analyzed to determine the physical and mechanical properties of the sediment.

The sediment acoustic probe 1, the sediment pore water pressure probe 2 and the three-dimensional resistivity probe 3 are hydraulically penetrated into the deposit through the probe hydraulic penetration system 6.

The above-described probe hydraulic penetration system 6 is composed of a hydraulic chamber 24, a control cabin 25, a drive cabin 26, a penetration mechanism battery compartment 27, and a penetration robot 28.

Considering that when the observation probe is penetrated, the observation device has just been released into the sea, and the long-term observation power supply system 5 has not stored enough electric energy, and the power supply of the probe hydraulic penetration system 6 is independently provided by the penetration mechanism battery compartment 27.

In order to ensure the smooth penetration of the probe into the sediment, for the hard bottom sea area, the sediment acoustic probe 1, the sediment pore water pressure probe 2 and the three-dimensional resistivity probe 3 are consistently entered; for the soft bottom sea area, The sediment acoustic probe 1, the sediment pore water pressure probe 2 and the three-dimensional resistivity probe 3 are uniformly penetrated once.

The method for releasing and recovering the long-term in-situ observation device of the deep sea seat bottom engineering geological environment of the present invention is as follows:

Drive the survey vessel to the designated station and stop the boat. The long-term in-situ observation device for the deep sea-seat bottom engineering geological environment was released by the shipborne geological winch, and the release speed was 1 m/s.

According to the water depth of the station and the length of the released steel cable, when the observation device is estimated to be 100 m-200 m from the seabed, the release speed is reduced to prevent the impact of the bottoming device from causing damage to the observation device.

After the instrument bottoms out, the sediment acoustic probe 1, the sediment pore water pressure probe 2 and the three-dimensional resistivity probe 3 are penetrated into the deposit by the probe hydraulic penetration system 6 of the observation device.

According to the quality of the observation area, it is determined whether the penetration method is one-time penetration or one-time uniform penetration.

At the end of the penetration, the acoustic release 8 at the top of the viewing device is activated. After the acoustic release is released, the cable is disconnected from the viewing device. Recycle the steel cable and complete the release of the observation device.

After long-term observation, according to GPS positioning, the survey vessel is driven to the release position for recovery of the observation device.

One end of the geological winch cable is fixed to the acoustic release release position of the subsea observation device by the underwater robot ROV.

After the ROV recovery is completed, the recovery of the submarine observation device is completed by recycling the geological winch steel cable.

Figure 8:
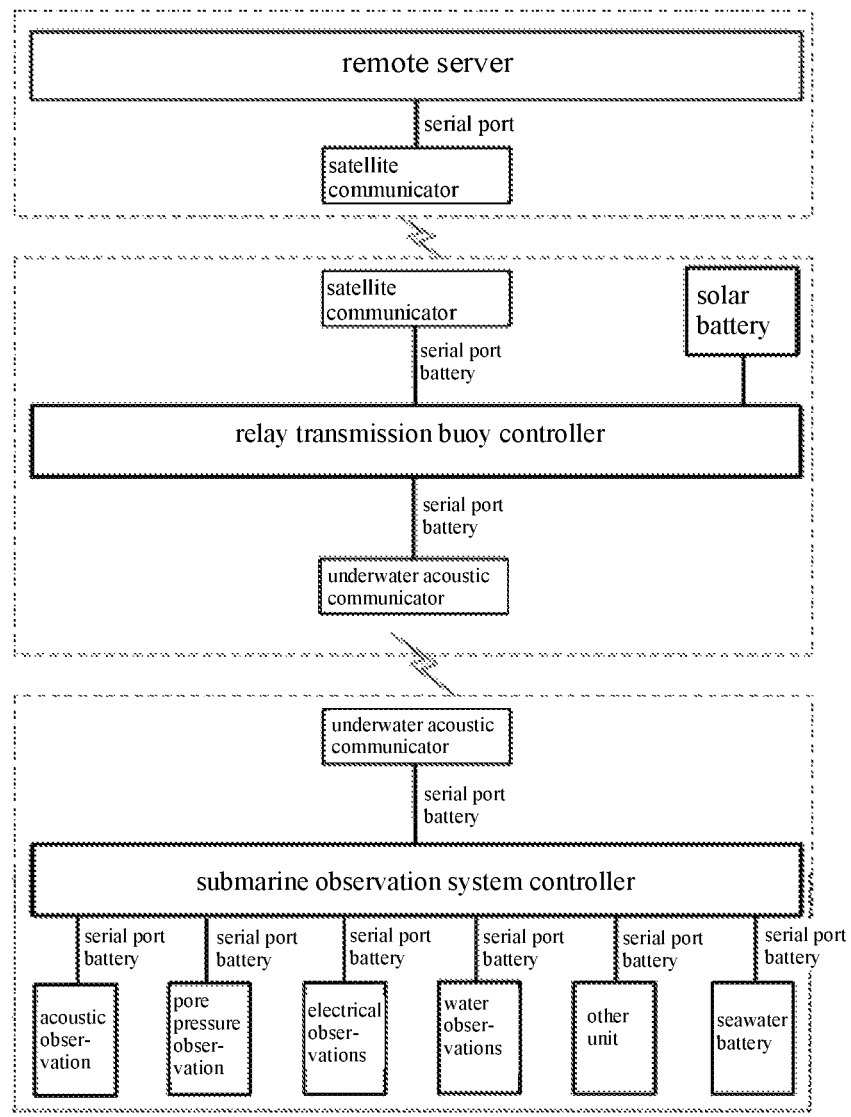
FIG. 8 is a schematic diagram showing a communication mode of a submarine observation system, a relay system, and the remote system of the present invention.

FIG. 8 is a schematic diagram showing the communication mode of the deep sea seat bottom engineering long-term observing device and the sea surface signal relay system and the remote server in the deep sea seat type engineering geological environment.

As shown in FIG. 8, the long-term in-situ observation device for the deep sea-seat bottom engineering geological environment is powered by seawater batteries to complete a series of data acquisition.

The collected data is transmitted to the sea surface signal relay system through underwater acoustic communication. The sea surface signal relay system is powered by a solar cell.

The sea surface signal relay system transmits data to the satellite in satellite communication, and the satellite transmits the data to the remote server by satellite communication.

Through the remote server, the user performs query, download, and analysis of the observed data.

According to the observation needs, when the observation parameters need to be adjusted, the remote server transmits the signals to the satellites by satellite communication. The satellite transmits the signal to the sea surface signal relay system by satellite communication.

The sea surface signal relay system transmits the signal over water acoustic communication to the submarine observation system.

INDUSTRIAL APPLICABILITY

The invention can carry out in-situ, long-term, real-time and comprehensive observation of the engineering properties, physical properties, mechanical properties and biochemical properties of the seawater-seabed interface-sediment in the water depth range of 2000 m. It has application value in marine environmental monitoring and marine geological disaster monitoring.

What is claimed is:
1. A long-term in-situ observation device for a deep sea bottom-supported engineering geological environment, comprising: a instrument platform (10) in a frame structure; wherein a sedimentary acoustic probe (1), a sediment pore water pressure probe (2), a three-dimensional resistivity probe (3), a probe hydraulic penetration system (6) configured to penetrate the probe into the seabed sediment, a water observation instrument (4), a long-term observation power supply system (5), a master control and data storage transmission system (7), an acoustic release (8) and a hydro-acoustic communicator (9) are provided on the instrument platform (10);

wherein the sediment acoustic probe (1) comprises an acoustic signal transmitting probe (11) and an acoustic signal receiving probe (12); wherein a directional transmission transducer (13) is provided on the acoustic signal emitting probe (11), a receiving transducer (14) is respectively provided at each different depths of the acoustic signal receiving probe (12); an end of the acoustic signal transmitting probe (11) and an end of the acoustic signal receiving probe (12) are connected to the master control and data storage transmission system (7) through acoustic signal transmission lines (15);

the directional transmission transducer (13) adopts a plurality of annular piezoelectric ceramic tubes connected in parallel to improve an emission voltage response of the directional transmission transducer (13); each receiving transducer (14) adopts a plurality of annular piezoelectric ceramic tubes connected in series to improve a receiving sensitivity thereof;

wherein the three-dimensional resistivity probe (3) comprises a resistivity vertical probe (20) and four resistivity level probes (21) which are crossed;

wherein electrode rings are respectively provided on the resistive vertical probe (20) and each resistivity level probe (21) with intervals; wherein the resistive vertical probe (20) and each resistivity level probe (21) are made of a three-type polypropylene material, and the electrode is a graphite electrode embedded in a probe body;

the pore water pressure sensor (17) of the sediment pore water pressure probe (2) adopts a fiber grating differential pressure sensor for converting a strain change on a grating into a wavelength change, and calibrating a relationship between the change of the center wavelength of the fiber grating and the pore water pressure, and calculating observation data into the pore water pressure of the sediment; wherein a rod body part of the sediment pore water pressure probe (2) is a stainless steel pipe (16), a pore water pressure sensor (17) is provided on a bottom of the stainless steel pipe (16), and an end of the pore water pressure sensor (17) is connected to the general control and data storage transmission system (7) through a pore water pressure signal transmission line (19);

the water observation instrument (4) comprises an integrated observation unit for a suspended matter concentration, a methane concentration, a dissolved oxygen concentration, a carbon dioxide concentration, a temperature, a salinity, and a current;

wherein the probe hydraulic penetration system (6) comprises a hydraulic cabin provided on the instrument platform (10), a control cabin (25), a drive cabin (26), a penetration mechanism battery compartment (27), and a penetration mechanical hand (28);

wherein the water observation instrument (4) is centrally powered by the long-term observation power supply system (5), or is independently powered by a self-contained battery.

2. A long-term in-situ observation device for a deep sea bottom-supported engineering geological environment, comprising: a instrument platform (10) in a frame structure; wherein a sedimentary acoustic probe (1), a sediment pore water pressure probe (2), a three-dimensional resistivity probe (3), a probe hydraulic penetration system (6) configured to penetrate the probe into the seabed sediment, a water observation instrument (4), a long-term observation power supply system (5), a master control and data storage transmission system (7), an acoustic release (8) and a hydro-acoustic communicator (9) are provided on the instrument platform (10);

wherein the sediment acoustic probe (1) comprises an acoustic signal transmitting probe (11) and an acoustic signal receiving probe (12); wherein a directional transmission transducer (13) is provided on the acoustic signal emitting probe (11), a receiving transducer (14) is respectively provided at each different depths of the acoustic signal receiving probe (12); an end of the acoustic signal transmitting probe (11) and an end of the acoustic signal receiving probe (12) are connected to the master control and data storage transmission system (7) through acoustic signal transmission lines (15);

the directional transmission transducer (13) adopts a plurality of annular piezoelectric ceramic tubes connected in parallel to improve an emission voltage response of the directional transmission transducer (13); each receiving transducer (14) adopts a plurality of annular piezoelectric ceramic tubes connected in series to improve a receiving sensitivity thereof;

wherein the three-dimensional resistivity probe (3) comprises a resistivity vertical probe (20) and four resistivity level probes (21) which are crossed;

wherein electrode rings are respectively provided on the resistive vertical probe (20) and each resistivity level probe (21) with intervals, wherein the resistive vertical probe (20) and each resistivity level probe (21) are made of a three-type polypropylene material, and the electrode is a graphite electrode embedded in a probe body;

the pore water pressure sensor (17) of the sediment pore water pressure probe (2) adopts a fiber grating differential pressure sensor for converting, a strain change on a grating into a wavelength change, and calibrating a relationship between the change of the center wavelength of the fiber grating and the pore water pressure, and calculating observation data into the pore water pressure of the sediment; wherein a rod body part of the sediment pore water pressure probe (2) is a stainless steel pipe (16), a pore water pressure sensor (17) is provided on a bottom of the stainless steel pipe (16), and an end of the pore water pressure sensor (17) is connected to the general control and data storage transmission system (7) through a pore water pressure signal transmission line (19);

the water observation instrument (4) comprises an integrated observation unit for a suspended matter concentration, a methane concentration, a dissolved oxygen concentration, a carbon dioxide concentration, a temperature, a salinity, and a current;

wherein the long-term observation power supply system (5) comprises four power generation units (22) and two electric energy storage units (23);

wherein the power generation units (22) adopt seawater dissolved oxygen batteries, and the four power generation units are provided in a central symmetric manner and are evenly provided outside the instrument platform (10); a frame structure of the instrument platform (10) is an open frame for internal seawater to pass freely; in such a manner that a sea current velocity near the power generation units (22) is configured to ensure a dissolved oxygen supply of the power supply system; wherein two electric energy storage units alternately charge and discharge, that is, one for storing electric energy and the other for powering an observation system.

3. A long-term in-situ observation device for a deep sea bottom-supported engineering geological environment, comprising: a instrument platform (10) in a frame structure; wherein a sedimentary acoustic probe (1), a sediment pore water pressure probe (2), a three-dimensional resistivity probe (3), a probe hydraulic penetration system (6) configured to penetrate the probe into the seabed sediment, a water observation instrument (4), a long-term observation power supply system (5), a master control and data storage transmission system (7), an acoustic release (8) and a hydro-acoustic communicator (9) are provided on the instrument platform (10);

wherein the sediment acoustic probe (1) comprises an acoustic signal transmitting probe (11) and an acoustic signal receiving probe (12); wherein a directional transmission transducer (13) is provided on the acoustic signal emitting probe (11), a receiving transducer (14) is respectively provided at each different depths of the acoustic signal receiving probe (12); an end of the acoustic signal transmitting probe (11) and an end of the acoustic signal receiving probe (12) are connected to the master control and data storage transmission system (7) through acoustic signal transmission lines (15);

the directional transmission transducer (13) adopts a plurality of annular piezoelectric ceramic tubes connected in parallel to improve an emission voltage response of the directional transmission transducer (13); each receiving transducer (14) adopts a plurality of annular piezoelectric ceramic tubes connected in series to improve a receiving sensitivity thereof;

wherein the three-dimensional resistivity probe (3) comprises a resistivity vertical probe (20) and four resistivity level probes (21) which are crossed;

wherein electrode rings are respectively provided on the resistive vertical probe (20) and each resistivity level probe (21) with intervals; wherein the resistive vertical probe (20) and each resistivity level probe (21) are made of a three-type polypropylene material, and the electrode is a graphite electrode embedded in a probe body;

the pore water pressure sensor (17) of the sediment pore water pressure probe (2) adopts a fiber grating differential pressure sensor for converting a strain change on a grating into a wavelength change, and calibrating a relationship between the change of the center wavelength of the fiber grating and the pore water pressure, and calculating observation data into the pore water pressure of the sediment; wherein a rod body part of the sediment pore water pressure probe (2) is a stainless steel pipe (16), a pore water pressure sensor (17) is provided on a bottom of the stainless steel pipe (16), and an end of the pore water pressure sensor (17) is connected to the general control and data storage transmission system (7) through a pore water pressure signal transmission line (19);

the water observation instrument (4) comprises an integrated observation unit for a suspended matter concentration, a methane concentration, a dissolved oxygen concentration, a carbon dioxide concentration, a temperature, a salinity, and a current;

wherein the probe hydraulic penetration system (6) comprises a hydraulic cabin provided on the instrument platform (10), a control cabin (25), a drive cabin (26), a penetration mechanism battery compartment (27), and a penetration mechanical hand (28);

wherein the water observation instrument (4) is centrally powered by the long-term observation power supply system (5), or is independently powered by a self-contained battery;

wherein the long-term observation power supply system (5) comprises four power generation units (22) and two electric energy storage units (23);

wherein the power generation units (22) adopt seawater dissolved oxygen batteries, and the four power generation units are provided in a central symmetric manner and are evenly provided outside the instrument platform (10); a frame structure of the instrument platform (10) is an open frame for internal seawater to pass freely; in such a manner that a sea current velocity near the power generation units (22) is configured to ensure a dissolved oxygen supply of the power supply system; wherein two electric energy storage units alternately charge and discharge, that is, one for storing electric energy and the other for powering an observation system; and wherein four anti-overturning bases (29) are provided symmetrically on a bottom of the instrument platform (10) for preventing the long-term in-situ observation device from overturning.

* * * * *